(12) United States Patent
Stewart

(10) Patent No.: US 9,344,374 B2
(45) Date of Patent: May 17, 2016

(54) NETWORK CONGESTION CONTROL

(75) Inventor: Randall Stewart, Chapin, SC (US)

(73) Assignee: Adara Networks, Inc., San Jose, CA (US)

( * ) Notice: Subject to any disclaimer, the term of this patent is extended or adjusted under 35 U.S.C. 154(b) by 53 days.

(21) Appl. No.: 13/543,539

(22) Filed: Jul. 6, 2012

(65) Prior Publication Data

US 2014/0010088 A1    Jan. 9, 2014

(51) Int. Cl.
*H04L 12/801*    (2013.01)
*H04L 12/825*    (2013.01)
*H04L 12/807*    (2013.01)

(52) U.S. Cl.
CPC .............. *H04L 47/33* (2013.01); *H04L 47/263* (2013.01); *H04L 47/27* (2013.01)

(58) Field of Classification Search
CPC ............ H04L 65/4092; H04L 12/2676; H04L 25/0262; H04L 43/0894; H04L 47/27; H04W 52/26; H04W 52/60
USPC ........................ 370/237, 232, 253, 389, 401
See application file for complete search history.

(56) References Cited

U.S. PATENT DOCUMENTS 7,180,858 B1 *    2/2007    Roy et al. ................... 370/232

FOREIGN PATENT DOCUMENTS

EP    0 430 571 A2    11/1990

OTHER PUBLICATIONS

"Quick start for TCP and IP, network working group, request for comments: 4782, Jan. 2007, 82 pages"), in view of Roy et al. (hereinafter referred as Roy) U.S. Pat. No. 7,180,858 B1.*
S. Floyd et al., Quick-Start for TCP and IP, Network Working Group, Request for Comments: 4782, Jan. 2007, 82 pages.*
Falk, A., et al., "Specification for the Explicit Control Protocol (XCP) draft-falk-xcp-spec-03.txt," Network Working Group, 41 pages. (Jul. 5, 2007).
Katabi, Dina, et al., "Internet Congestion Control for Future High Bandwidth-Delay Product Environments," ACM SIGCOMM, 16 pages. (Aug. 1, 2002).
PCT Notification of Transmittal of the International Search Report and the Written Opinion of the International Searching Authority, or the Declaration for PCT Counterpart Application No. PCT/US2013/040000 Containing International Search Report, 7 pages. (Jul. 25, 2013).
PCT Notification Concerning Transmittal of International Preliminary Report on Patentability for PCT Application No. PCT/US2013/040000, 8 pgs. (Jan. 15, 2015).

* cited by examiner

*Primary Examiner* — Ian N Moore
*Assistant Examiner* — Mewale Ambaye
(74) *Attorney, Agent, or Firm* — Blakely, Sokoloff, Taylor & Zafman LLP

(57) ABSTRACT

Exemplary methods, apparatuses, and systems include a router receiving a first network packet being transmitted across a network path from a first endpoint to a second endpoint, determining that the first network packet does not include a requested rate, modifying the first network packet to include a requested rate in response to determining that the received network packet does not include a requested rate, and transmitting the modified first network packet along the network path to the second endpoint.

20 Claims, 6 Drawing Sheets

NETWORK CONGESTION CONTROL

FIELD

The various embodiments described herein relate to apparatuses, systems, and methods to control network congestion. In particular, embodiments include a router setting a rate for the amount of data an endpoint may submit into the network.

BACKGROUND

Network congestion occurs when a router is carrying so much data that the router's quality of service deteriorates. This deterioration of service may include the router dropping packets. If endpoints use aggressive retransmissions to compensate for dropped packets, this may lead to a state where the routers continue dropping packets that were retransmitted and the endpoints continue retransmitting old packets, such that no useful work is accomplished. This state is known as "congestion collapse."

Modern networks use congestion control and network congestion avoidance techniques to avoid congestion collapse. For example, endpoints utilizing Transmission Control Protocol/Internet Protocol ("TCP/IP") maintain a congestion window for a connection with another endpoint. The sending endpoint uses the congestion window in determining the total number of unacknowledged packets/bytes that the sending endpoint may transmit into the network at any point during a flow of data transmitted across the connection.

Slow-start is a TCP/IP algorithm that includes starting with an initial congestion window of a small number of segments/packets. In response to receiving acknowledgements ("ACKs"), the congestion window grows exponentially until the congestion window size reaches the size of the receiver endpoint's advertised window or until a loss occurs. Once a loss is detected using the endpoints retransmission timer, the sending endpoint saves half of the current congestion window as a slow-start threshold and the slow-start algorithm begins again by sending data with its congestion window set to one segment. Once the congestion window reaches the slow-start threshold, the sending endpoint enters a congestion avoidance mode and ACKs result in a linear increase of the congestion window. In an alternate method, if the loss is detected via three duplicate acknowledgements being detected for the same packet, the congestion window is reduced to the value of slow-start threshold (i.e., ½ of the congestion window when the loss was detected) and the endpoint enters congestion avoidance.

Both recovery algorithms result in a dramatic decrease in congestion window size in response to packet loss. Additionally, these algorithms increase the congestion window slowly when ramping back up after a packet loss. This slow rate of increasing the congestion window is especially apparent for connections with a long round trip time (the length of time it takes for a packet to be sent plus the length of time it takes for an acknowledgment of that packet to be received). The abrupt decreases and slow increases in congestion window size and the reliance upon packet loss to determine when to stop increasing the congestion window are inefficient congestion controls.

Network Working Group Request for Comments 4782, Quick-Start for TCP and IP, authored by Sally Floyd, Mark Allman, Amit Jain, and Pasi Sarolahti in January 2007 ("Quick-Start") describes the sending endpoint negotiating an initial congestion window with routers along the network path to a receiving endpoint. Endpoints, and not the routers, are able to initiate the negotiation of the congestion window. Routers along the network path may only decrease the requested initial rate set by an endpoint. While Quick-Start uses this negotiation to avoid slow-start's initial ramp up of the congestion window until packet loss occurs, the endpoints use the recovery algorithms described above once packet loss does occur. Additionally, the endpoints may only initiate the negotiation of the congestion window at the start of a data transfer or after an idle period.

SUMMARY

Exemplary methods, apparatuses, and systems include a router receiving a first network packet being transmitted across a network path from a first endpoint to a second endpoint, determining that the first network packet does not include a requested rate, modifying the first network packet to include a requested rate in response to determining that the received network packet does not include a requested rate, and transmitting the modified first network packet along the network path to the second endpoint. For one embodiment, the router determines that a network packet prior in the flow to the first network packet included a code to indicate that routers are permitted to set the requested transmission rate and the router modifies the first network packet to include the requested rate in response to determining that the prior network packet included the code.

Exemplary methods, apparatuses, and systems also include a first endpoint transmitting a network packet across a network path from the first endpoint to a second endpoint. For one embodiment, the network packet is sent mid-flow following a packet that included a code to indicate a router within the network path is permitted to set the requested transmission rate. The network packet does not include a requested rate when transmitted by the first endpoint.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments of network congestion control described herein include a router receiving a first network packet being transmitted across a network path from a first endpoint to a second endpoint and setting the rate for the congestion window for the first endpoint. The described network congestion control allows the network path to negotiate a congestion window while avoiding abrupt decreases and slow increases in congestion window size in response to dropped packets. Additionally, the described network congestion control allows the first endpoint to benefit from the router having a greater ability to determine congestion/available bandwidth and use that determination as a basis for the setting the rate. The router setting the rate is able to utilize the described network congestion control at any point during a flow of network packets.

Figure 1:
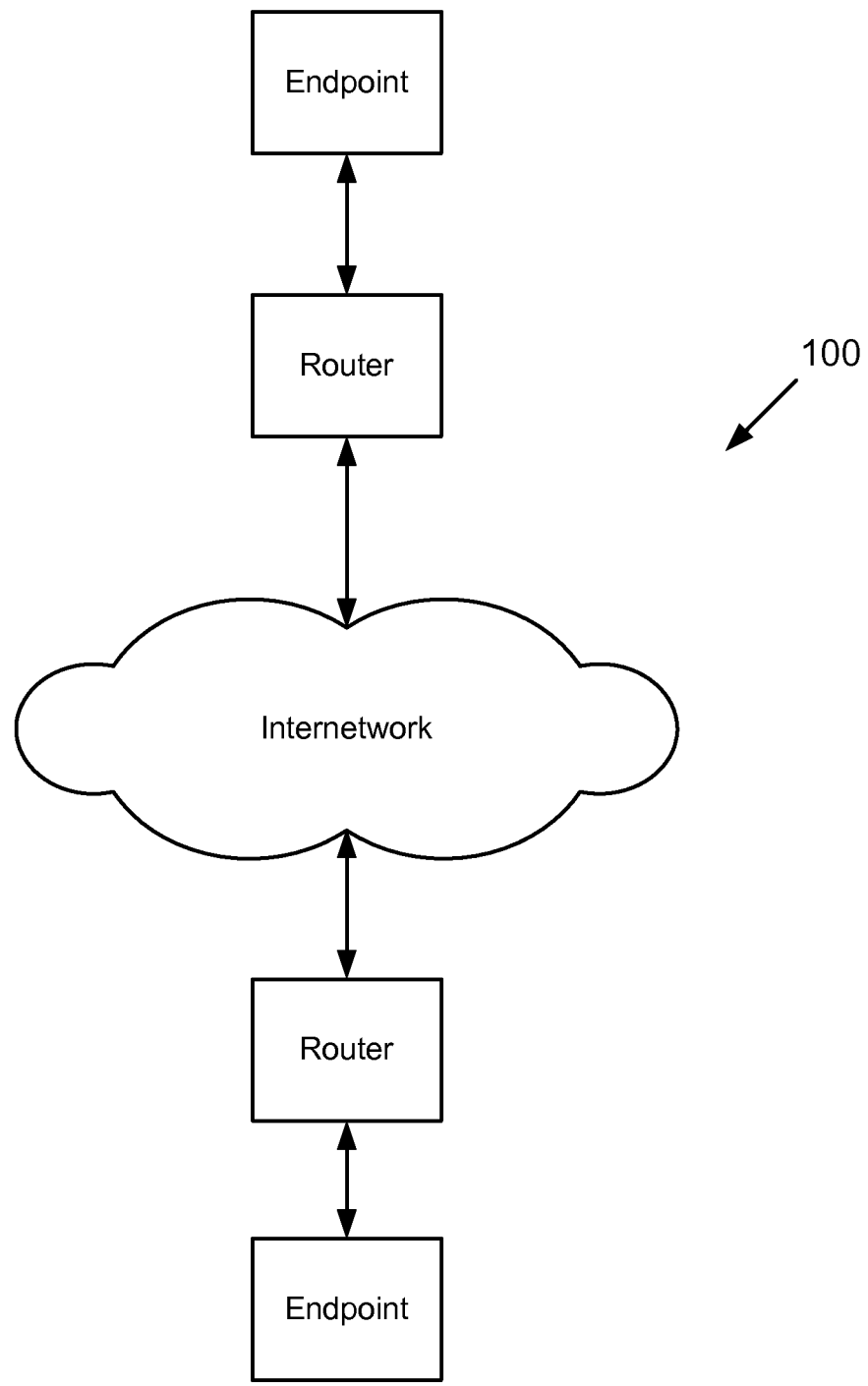
FIG. 1 illustrates an exemplary network path between endpoints.
Figure 6:
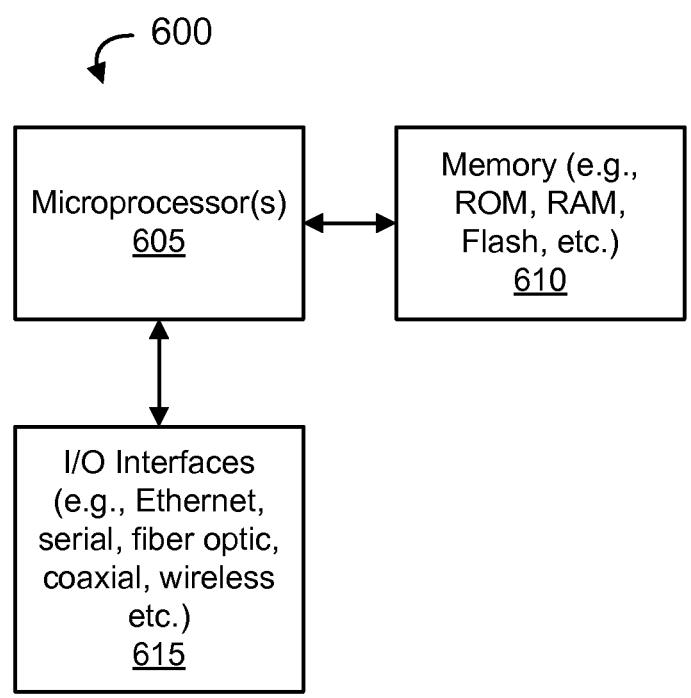
FIG. 6 illustrates, in block diagram form, an exemplary processing system for setting a rate for the amount of data an endpoint may submit into the network.

FIG. 1 illustrates an exemplary network path 100 between endpoint devices. The network path 100 includes at least one endpoint device to transmit data, one or more routers to forward the data along the network path 100, and another endpoint device to receive the data. For one embodiment, the network path 100 includes an internetwork including a plurality of routers and that forward data along a plurality of network paths (e.g., the Internet). As discussed in greater detail below, an embodiment of the data processing system 600 illustrated in and described with reference to FIG. 6, represents either an endpoint or a router in the network path 100.

For one embodiment, the routers illustrated in FIG. 1 serve as tunneling interfaces and create an overlay network along the network path 100. For example, in an overlay network embodiment, network packets transmitted between the illustrated routers are encapsulated according to a tunneling encapsulation protocol. For an embodiment utilizing network packets according to TCP/IP, an IP datagram includes an IP header and an encapsulated TCP segment. The IP datagram may be encapsulated according to a tunneling encapsulation protocol, such as Generic Routing Encapsulation or another tunneling protocol.

If there is an overlay network along the network path 100, a first tunneling interface router adds an "outer" header to the network packet according to the tunneling protocol. In an exemplary TCP/IP network, the "inner" and "outer" headers both meet the requirements of an IP header. The intervening routers along the network path 100 (e.g., illustrated as the internetwork) need not parse or interpret the "inner" header of the network packet, which will be described in greater detail with reference to FIG. 2. A second tunneling interface router, however, parses the "inner" header. For one embodiment, the second tunneling interface router determines whether the network packet should continue along the network path 100 encapsulated according to the tunneling protocol or if the network packet may be forwarded without an "outer" header. While the example above includes only two tunneling interface routers, more than two tunneling interfaces are included along the network path 100 in at least one embodiment.

Figure 2:
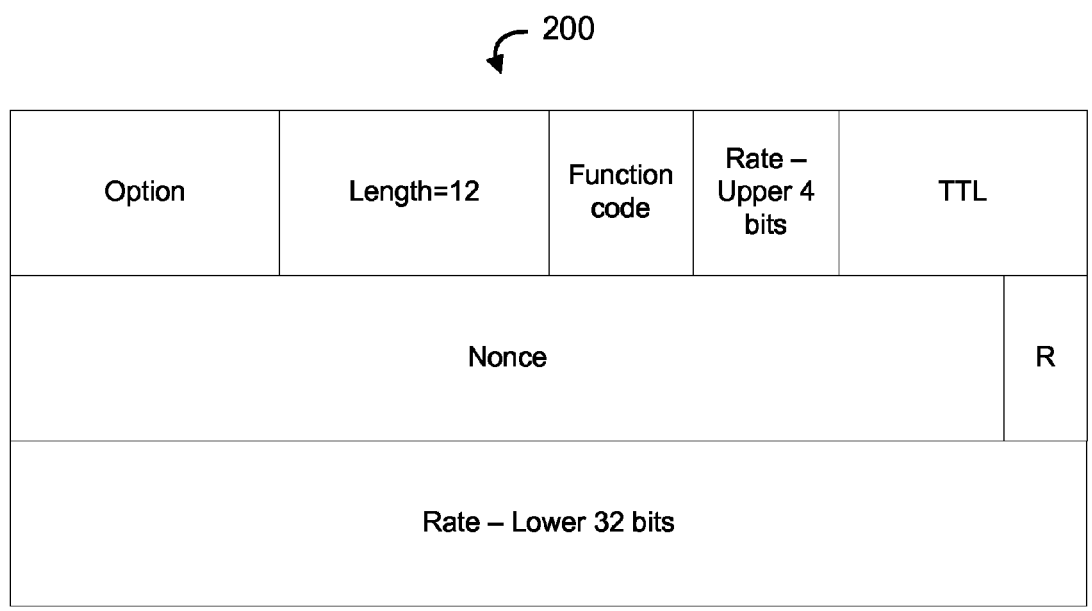
FIG. 2 illustrates a portion of an exemplary network packet including a transmission rate field for a router to set the rate for the amount of data an endpoint may submit into the network.

FIG. 2 illustrates an option portion of an exemplary network packet 200 including a transmission rate field for a router to set the rate for the congestion window. For one embodiment, the network packet is IP datagram and the illustrated portion is included within the options field of the IP header. For an alternate embodiment, the network packet is Stream Control Transmission Protocol ("SCTP") packet, a Datagram Congestion Control Protocol ("DCCP") packet, or another Transport/Internet layer protocol and the illustrated portion is included within the corresponding field.

The first byte of the illustrated option portion of the network packet 200 is an option field. The option field includes a one-bit copy flag to indicate whether or not the network packet is a fragment, a two-bit class field to indicate a general category in which the option belongs, and a five-bit option number to specify the kind of option 200.

The second byte is a length field to indicate the length of the option 200. In the illustrated embodiment, the length is set to twelve bytes.

The third byte of the illustrated option portion of the network packet 200 includes a four-bit function code and the upper four bits of the rate. The function code indicates whether the option 200 is a rate request from an endpoint (e.g., function code 0000), a rate report from an endpoint (e.g., function code 1000), or whether the option enables a router to set the rate for the congestion window (e.g., function code 1100). As described above, the rate, or congestion window, refers to the amount of data an endpoint may submit into the network prior to receiving an ACK.

For one embodiment the rate is represented as a 36-bit value and enables endpoints and routers to specify the rate in increments of one kilobit per second. The upper four bits of the rate are included in the illustrated third byte and the lower 32 bits are included in the last four bytes of the illustrated portion of the network packet option 200.

The fourth byte of the illustrated option portion of the network packet 200 indicates the network packet's time to live ("TTL"). Generally a TTL limits the lifespan of the network packet using, e.g., a counter or timestamp. Once the prescribed event count or timespan has elapsed, the network packet is discarded. For one embodiment, the illustrated TTL field is decremented by each router that approves the option to utilize the rate requests described herein.

For an embodiment in which the network packet is an IP datagram and the illustrated option portion 200 is included within the options field of the IP header, the IP datagram may include an IP TTL in addition to the TTL included within the fourth byte of the illustrated option portion of the network packet 200. The IP TTL field is set by the sender of the IP datagram and decremented by every router within the network path 100 to the destination of the IP datagram. For an alternate embodiment, the IP datagram includes a Hop Limit field, which servers a similar purpose to the IP TTL field.

For one embodiment, the sending endpoint and the receiving endpoint both calculate a difference between the illustrated TTL field and the IP TTL/Hop Limit field. The receiving endpoint transmits the calculated difference in the TCP header of an ACK sent to the sending endpoint. The sending endpoint, upon receipt of the ACK, compares the two calculated differences to determine if any routers along the network path 100 do not approve of the requested option. For one embodiment, a router that does not approve of the option decrements the IP TTL/Hop Limit field but forwards the network packet without decrementing the illustrated TTL field. The sending endpoint will be able to determine from the calculated difference that not all routers were able to parse/approve the requested option. For one embodiment, when a router decrements the illustrated TTL field and the IP TTL/Hop Limit field, both fields are decremented by the same amount.

The fifth, sixth, seventh, and eighth bytes of the illustrated option portion of the network packet 200 include a 30-bit nonce and a two-bit reserved field. The nonce is a random number set by the sending endpoint. For one embodiment, the sending endpoint saves a copy of the nonce for comparison to a nonce received in a corresponding ACK. The sending endpoint compares the saved value of the nonce against the nonce received in the ACK and determines whether rate was properly set by the previous request.

Each bit in the nonce corresponds to a decrease from one range of rates to another range of rates. If a router along the network path 100 lowers the requested rate (whether the request rate is initially set by the sending endpoint or by another router), that router lowering the requested rate also modifies the corresponding bit to indicate that the rate was lowered from one range of rates to an adjacent range of rates. If the requested rate is lowered by more than one range of rates, the router modifies multiple bits of the nonce to indicate the full range of decrease. If a subsequent router or the receiving endpoint attempts to increase the requested rate, because the nonce is a random number, it is unlikely that said device will also be able to modify the nonce to hide the indication of the previous router lowering the requested rate. The receiving endpoint transmits the nonce back to the sending endpoint in the ACK. After comparing the received nonce to the saved nonce, the sending endpoint determines from modified bits that the requested rate was lowered. If the nonce indicates that the rate was lowered further than the rate acknowledged by the receiving endpoint, the sending endpoint determines that the acknowledged rate was improperly increased or is otherwise incorrect and either sends a new request or reverts to another form of congestion control.

For one embodiment, when the function code enables a router to set the rate for the congestion window, the router that sets the rate (e.g., to less than a maximum rate) also modifies the nonce bit(s) to indicate that the rate was "lowered" from the maximum rate to the set rate. While the rate is initially being set and not technically being lowered, this modification of the nonce will enable the sending endpoint to determine if a subsequent device attempted to increase the rate without the sending endpoint having knowledge of the rate set by the router. For an alternate embodiment, the nonce field is deactivated or otherwise ignored when the function code enables a router to set the rate for an initial congestion window.

The reserved field allows for the setting of additional options. For example, for one embodiment, the second bit of the reserved field is set to "1" to indicate the use of the network congestion control described herein.

Figure 3:
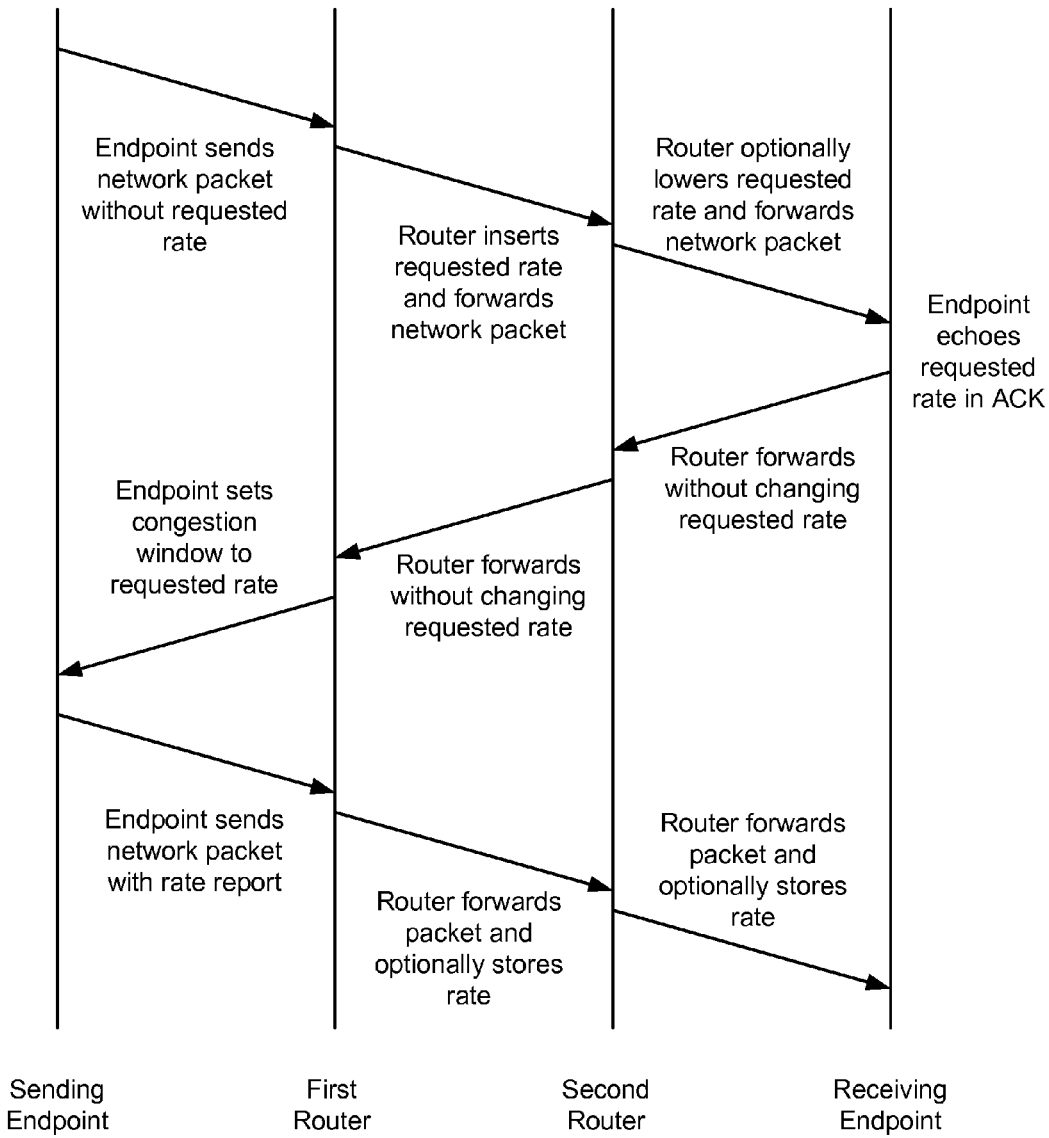
FIG. 3 illustrates an exemplary exchange of network packets between endpoints in which a router sets the rate for the amount of data an endpoint may submit into the network.

FIG. 3 illustrates an exemplary exchange of network packets between endpoints and, during the exchange, a router sets the rate for the congestion window for the sending endpoint. For one embodiment, the router sets the rate for the congestion window mid-flow after the sending endpoint has successfully requested and negotiated an initial rate for the congestion window (e.g., using the network packet option 200 described above). Quick-Start provides an additional exemplary method of the sending endpoint requesting and negotiating an initial rate for the congestion window. For an alternate embodiment, the router requests an initial rate for the congestion window at the beginning of the flow.

The sending endpoint sends a network packet along a network path 100 without a requested rate. For an embodiment in which the router sets the initial rate, the sending endpoint sets one or more fields as described above with reference to FIG. 2. Exemplary field settings include one or more of a function code to enable a router set the initial rate, the TTL, and the nonce.

For an embodiment in which the router sets the rate mid-flow, the router determines that the sending endpoint sent a network packet without the option portion 200 described above. For example, the router determines from a saved copy of one or more of a nonce, TTL, or Hop Limit field in an initial rate request network packet from the sending endpoint that the network path 100 supports a rate request as described herein. For one embodiment, the router determines that it may set a rate mid-flow in response to receiving a rate report from the sending endpoint following a rate request from the sending endpoint. If, the router determines during the flow that the router is able to support a higher rate than the initial rate, the router inserts a request for a rate for the congestion window as described further below.

For an embodiment in which the router sets the initial rate, the first router receives the network packet, determines that an initial rate has not yet been set, and inserts a request for an initial rate for the congestion window as described further below. For this embodiment, the determination that an initial rate has not yet been set includes receiving a network packet including an option portion 200 that includes a function code that enables a router to set the rate and/or a requested rate set to zero or a maximum value.

For one embodiment, the first router further determines that the function code has been set, in initial rate request network packet or in the first network packet, to enable a router to set the rate. The first router inserts the requested rate and forwards the network packet along the network path 100. For one embodiment, the first router sets the requested rate based upon a number of flows going through the first router along a portion of the network path 100 and/or an amount of available bandwidth for the first router along that portion of the network path 100. The first router decrements the TTL(s) and/or modifies the nonce as described above.

The second router receives the network packet that was modified by the first router to include a requested rate. For one embodiment, the network packet is transmitted between the first and second routers via an internetwork (e.g., according to a tunneling protocol, as described above). For an alternate embodiment, the network packet is transmitted between the first and second routers without one or more routers in the network path 100 between the first router and the second router.

For one embodiment, the second router approves of the option and requested rate and forwards the network packet along the network path 100 to the receiving endpoint. Alternatively, the second router approves of the option but lowers the requested rate. For example, if there are more flows and/or less available bandwidth along the network path 100 at the second router, the second router may determine that the requested rate should be lower than the rate requested by the first router. For one embodiment, the second router decrements the TTL(s) and/or modifies the nonce if necessary, as described above.

The receiving endpoint receives the network packet including the router-requested rate for the congestion window. In response, the receiving router creates an ACK network packet and transmits the ACK to the sending endpoint. The ACK includes the rate as set by the first router or the rate as modified by the second router. For an embodiment utilizing network packets according to TCP/IP, the ACK is an IP datagram and the initial rate is included within the TCP header. If an alternate networking protocol is used, the initial rate is encapsulated in a corresponding manner. The second and first routers forward the ACK to the sending endpoint without parsing or changing the initial rate (e.g., because it is included with the TCP header rather than the IP header).

Similar to the initial network packet described above, the ACK is transmitted between the second and first routers via an internetwork (e.g., according to a tunneling protocol). The exemplary exchange illustrated in FIG. 3 shows the ACK traversing along the same network path 100 as the first network packet sent by the sending endpoint. For an alternate embodiment, the ACK may be sent along a different path. For one embodiment, one or both of the first and second routers are part a number of different network paths between the endpoints.

The sending endpoint receives the ACK network packet and, in response, sets a congestion window according to the requested rate acknowledged by the receiving endpoint. For one embodiment, as described above, the sending endpoint verifies the acknowledged rate by comparing a saved copy of the nonce transmitted in the first packet with a received copy of the nonce in the ACK. For one embodiment, the sending endpoint verifies that the rate request was approved by routers along the network path 100 by comparing the TTL field in the ACK with the IP TTL/Hop Limit field in the ACK as described above. For one embodiment, the sending endpoint lowers the acknowledged rate based upon the rate at which the sending endpoint is able to transmit packets.

Further in response to the receiving the acknowledged rate, the sending endpoint sends a third network packet including a rate report. The rate report includes the acknowledged rate as received/lowered by the sending endpoint. For one embodiment, the rate report is included in the first data packet of the flow. Alternatively, the rate report is included in a separate control packet. For one embodiment, the sending endpoint sets one or more fields in the third network packet as described above with reference to FIG. 2. Exemplary field settings include a function code to indicate that the rate is being reported and the rate field to indicate the acknowledged rate.

For one embodiment, each of the first and second routers saves the requested rate as approved by that router (e.g., the first router saves the rate it inserted and the second router saves the initial rate or the lowered rate). Each router compares the saved requested rate to the reported rate to ensure that the rate has not been set to a rate higher than that router approved. For one embodiment, a router uses the saved reported rate in determining available bandwidth along the network path 100 or whether or not to request an increase or decrease in the rate subsequently in the flow. Additionally, the first and second routers forward the third packet to the receiving endpoint.

The exchange illustrated in FIG. 3 and described above may be performed at any point during a flow and is not limited to the initiation of the flow or idle periods. For one embodiment, the sending endpoint transmits a fourth packet similar to the first packet following the third packet, in response to acknowledgement of the third packet, following another packet, or in response to an acknowledgment received mid-flow. For an alternate embodiment, the sending endpoint initiates the illustrated exchange in response to a number of packets being sent or acknowledged during the flow, an amount of time being elapsed during the flow, one or more dropped packets, or another trigger.

Figure 4:
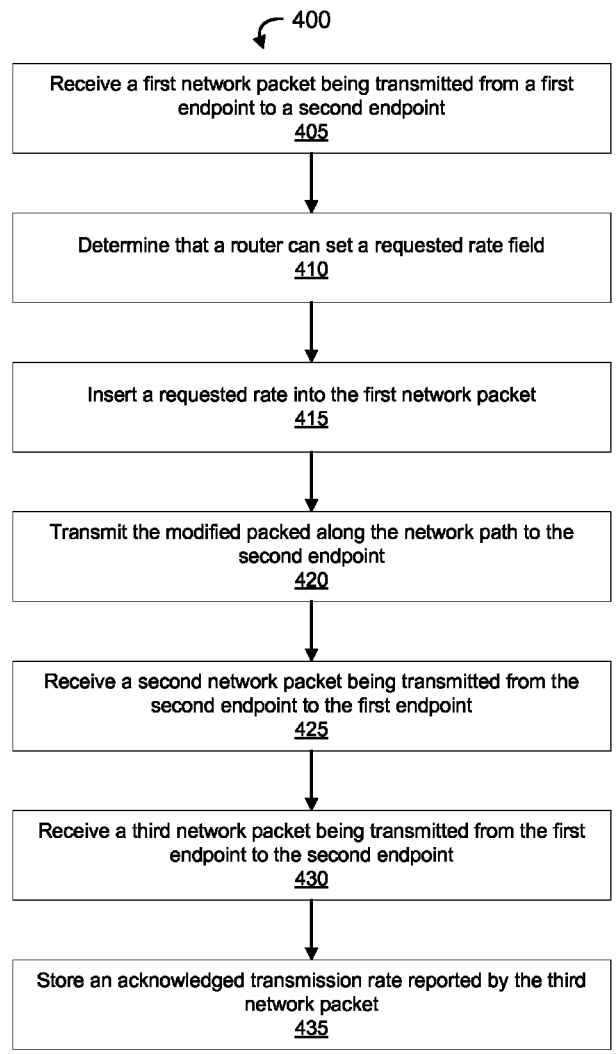
FIG. 4 illustrates an exemplary method of a router setting the rate for the amount of data an endpoint may submit into the network.

FIG. 4 illustrates an exemplary method 400 of a router setting the congestion window for an endpoint. For example, the method 400 is performed by the first router illustrated in and described with reference to FIG. 3. At block 405, the router receives a first network packet being transmitted from a first endpoint (e.g., the sending endpoint) to a second endpoint (e.g., the receiving endpoint). At block 410, the router determines that the router can set the requested rate field. For one embodiment, the determination includes determining that an initial rate had been requested by the sending endpoint and acknowledged by the receiving endpoint (e.g., as determined by a subsequent rate report) in an exchange of previously sent network packets in the flow. For an alternate embodiment, the determination includes determining that the initial rate has not yet been set. For one embodiment, the determination further includes determining that the function code in a network packet in the flow indicated that the router is permitted to set the rate. At block 415, the router inserts a requested rate into the first network packet. At block 420, the router forwards the modified network packet to the second endpoint.

At block 425, for an embodiment in which the network path for the ACK network packet from the second endpoint includes the same router, the router receives and forwards a second network packet (ACK) to the first endpoint. At block 430, for an embodiment that includes rate reporting, the router receives, from the first endpoint, a third network packet including a rate report.

At block 435, the router optionally saves the reported rate. For one embodiment, the router compares the reported rate to a saved copy of the rate the router set in the first network packet. If the reported rate is higher than the rate set by the router, the router determines that the rate is incorrect and implements a policy in response to the incorrect reported rate. Exemplary policies include the router dropping packets beyond the initial rate and denying future rate requests from the sending endpoint.

Figure 5:
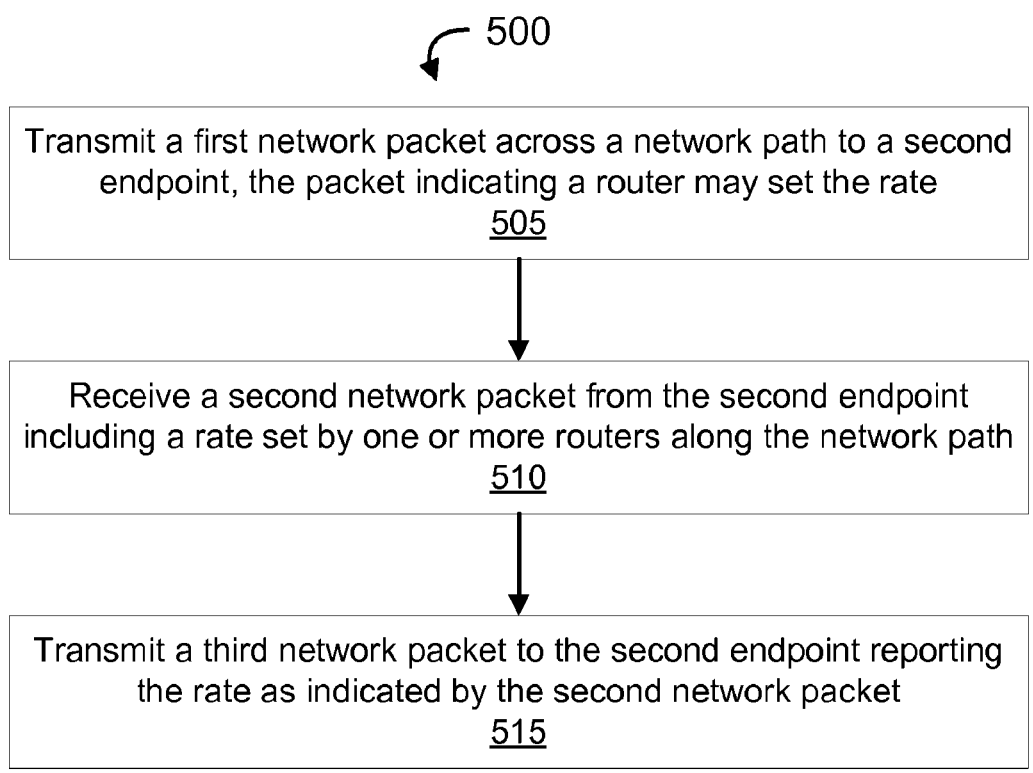
FIG. 5 illustrates an exemplary method of an endpoint transmitting a first network packet without a requested or reported rate and receiving a second network packet including a rate set by one or more routers along the network path.

FIG. 5 illustrates an exemplary method 500 of a first endpoint transmitting a first network packet without a requested rate and receiving a second network packet including a rate set by one or more routers along the network path. Exemplary method 500 is performed by the sending endpoint illustrated in and described with reference to FIG. 3 and the first endpoint described above with reference to FIG. 4.

At block 505, the first endpoint transmits a first network packet. The first network packet includes an indication that a router in the network path is permitted to set the rate. For one embodiment, the indication that the router is permitted to set the rate is that the first network packet does not include a requested rate and is a mid-flow packet that follows the sending endpoint successfully requesting a rate as described above. For an alternate embodiment, the indication that the router is permitted to set the rate includes one or both of the rate field containing a zero or maximum value and a function code indicating that a router sets the rate.

At block 510, the first endpoint receives a second network packet (e.g., an ACK) from a second endpoint. The second network packet includes an acknowledged rate request for a rate set by one or more routers along the network path between the first and second endpoints. The second network packet is sent in response to and in acknowledgment of the first network packet that did not include a requested rate from the sending endpoint. At block 515, the first endpoint transmits a third network packet reporting the acknowledged rate as indicated by the second network packet.

FIG. 6 illustrates, in block diagram form, an exemplary data processing system 600 that enables a router to set a rate for a congestion window, as described herein. Data processing system 600 includes one or more microprocessor(s) 605 and connected system components. For one embodiment the microprocessor(s) 605 are coupled to separate system components (e.g., multiple connected chips). Alternatively, one or more system components are included with one or more of the microprocessors 605 in a system on a chip.

The data processing system 600 includes memory 610, which is coupled to the microprocessor(s) 605. The memory 610 stores data, metadata, and/or programs for execution by the microprocessor(s) 605. For one embodiment, the memory 610 stores routing table. The memory 610 may include one or more of volatile and non-volatile memories, such as Random Access Memory ("RAM"), Read Only Memory ("ROM"), a solid state disk ("SSD"), Flash, Phase Change Memory ("PCM"), or other types of data storage.

The system 600 also includes one or more input or output ("I/O") interfaces 615 which are provided to allow a user to provide input to, receive output from, and otherwise transfer data to and from the system. The I/O interfaces 615 may also include one or more of an Ethernet port, fiber optic port, coaxial cable port, FireWire port, Thunderbolt port, a wireless transceiver, etc. to connect the system 600 with another device, external component, or a network.

One or more buses may be used to interconnect the various components shown in FIG. 6.

For one embodiment, the data processing system 600 is a network device that forwards data between endpoint devices, such as a router, gateway, or switch. For an alternate embodiment, the data processing system 600 is an endpoint device that initiates the transmission of data to a network device. Exemplary endpoint devices include a personal computer, tablet-style device, or a handheld computer (e.g., including a cellular telephone, a media player, an entertainment system, etc.), a network computer, or an embedded processing device within another device or consumer electronic product. As used herein, the terms "computer" and "apparatus comprising a processing device" may be used interchangeably with the data processing system 600 and include the above-listed exemplary embodiments.

Additional components, not shown, are a part of the data processing system 600. For example, one embodiment of the data processing system 600 includes port adapters or other modular interface controllers that contain circuitry to transmit and receive packets on physical media. Aspects of the inventions may be embodied, at least in part, in software. That is, the computer-implemented methods may be carried out in a computer system or other data processing system in response to its processor or processing system executing sequences of instructions contained in a memory, such as memory 610 or another non-transitory machine-readable storage medium. In various embodiments, hardwired circuitry may be used in combination with the software instructions to implement the present embodiments. Thus, the techniques are not limited to any specific combination of hardware circuitry and software, or to any particular source for the instructions executed by the data processing system 600.

In the foregoing specification, the invention has been described with reference to specific exemplary embodiments thereof. It will be evident that various modifications may be made thereto without departing from the broader spirit and scope of the invention. Numerous specific details are described to provide a thorough understanding of various embodiments. In certain instances, however, well-known or conventional details are not described in order to provide a concise discussion of embodiments. For example, the methods described herein may be performed with fewer or more function blocks or the described function blocks may be performed in differing orders. Additionally, the methods described herein may be repeated or performed in parallel with one another or in parallel with different instances of the same or similar methods.

An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

What is claimed is:

1. A computer-implemented method comprising:
   receiving, by a first router from a first endpoint or a second router, a received network packet being transmitted across a network path from the first endpoint to a second endpoint;
   determining, by the first router, that the received network packet does not include a requested rate;
   determining, by the first router, that a network packet prior to the received network packet and within a same flow as the received network packet includes an indication, wherein the indication indicates that routers are permitted to set the requested transmission rate;
   modifying, by the first router, the received network packet to include a requested rate in a requested transmission rate field in response to determining that the received network packet does not include a requested rate and in response to determining that the prior network packet includes the indication; and
   transmitting, by the first router, the modified received network packet along the network path to the second endpoint.

2. The method of claim 1, further comprising:
   receiving, by the first router, a second received network packet being transmitted across a network path from the second endpoint to the first endpoint in response to the modified received network packet;
   wherein the second received network packet includes an acknowledged transmission rate; and
   wherein the acknowledged transmission rate is one of the requested transmission rate the first router inserted into the modified received network packet or a lesser requested transmission rate set by a subsequent router along the network path between the first router and the second endpoint.

3. The method of claim 1, further comprising:
   receiving, by the first router, a third received network packet being transmitted across a network path from the first endpoint to the second endpoint, the third received network packet sent in response to the second received network packet acknowledging receipt of the modified received network packet by the second endpoint, wherein the third received network packet reports the acknowledged transmission rate.

4. The method of claim 3, further comprising:
   storing, by the first router, the acknowledged transmission rate reported by the third received network packet.

5. The method of claim 1, wherein the requested rate is represented by more than four bits of the modified received network packet.

6. The method of claim 1, further comprising:
   determining, by the first router, the requested rate based upon a number of flows going through the first router along a portion of the network path and an amount of available bandwidth for the first router along the portion of the network path.

7. A non-transitory machine-readable medium storing instructions that, when executed, cause a processing device to perform a method comprising:

receiving, by a first router from a first endpoint or a second router, a received network packet being transmitted across a network path from the first endpoint to a second endpoint;

determining, by the first router, that the received network packet does not include a requested rate;

determining, by the first router, that a network packet prior to the received network packet and within a same flow as the received network packet includes an indication, wherein the indication indicates that routers are permitted to set the requested transmission rate;

modifying, by the first router, the received network packet to include a requested rate in a requested transmission rate field in response to determining that the received network packet does not include a requested rate and in response to determining that the prior network packet includes the indication; and transmitting, by the first router, the modified received network packet along the network path to the second endpoint.

8. The non-transitory machine-readable medium of claim 7, wherein the instructions, when executed, cause the processing device to perform a method further comprising:

receiving, by the first router, a second received network packet being transmitted across a network path from the second endpoint to the first endpoint in response to the modified received network packet;

wherein the second received network packet includes an acknowledged transmission rate; and wherein the acknowledged transmission rate is one of the requested transmission rate the first router inserted into the modified received network packet or a lesser requested transmission rate set by a subsequent router along the network path between the first router and the second endpoint.

9. The non-transitory machine-readable medium of claim 7, wherein the instructions, when executed, cause the processing device to perform a method further comprising:

receiving, by the first router, a third received network packet being transmitted across a network path from the first endpoint to the second endpoint, the third network packet sent in response to the second received network packet acknowledging receipt of the modified received network packet by the second endpoint, wherein the third received network packet reports the acknowledged transmission rate.

10. the non-transitory machine-readable medium of claim 9, wherein the instructions, when executed, cause the processing device to perform a method further comprising:

storing, by the first router, the acknowledged transmission rate reported by the third received network packet.

11. The non-transitory machine-readable medium of claim 7, wherein the requested rate is represented by more than four bits of the modified received network packet.

12. The non-transitory machine-readable medium of claim 9, wherein the instructions, when executed, cause the processing device to perform a method further comprising:

determining, by the first router, the requested rate based upon a number of flows going through the first router along a portion of the network path and an amount of available bandwidth for the first router along the portion of the network path.

13. A router comprising:
a memory, and
a processing device coupled to the memory, wherein the processing device executes instructions that cause the router to receive, from a first endpoint or another router, a received network packet being transmitted across a network path from the first endpoint to a second endpoint;

determine that the received network packet does not include a requested rate;

determine that a network packet prior to the received network packet and within a same flow as the received network packet includes an indication, wherein the indication indicates that routers are permitted to set the requested transmission rate;

modify the received network packet to include a requested rate in a requested transmission rate field in response to determining that the received network packet does not include a requested rate and in response to determining that the prior network packet includes the indication; and transmit the modified received network packet along the network path to the second endpoint.

14. The router of claim 13, wherein execution of the instructions further causes the router to:

receive a second received network packet being transmitted across a network path from the second endpoint to the first endpoint in response to the modified received network packet;

wherein the second received network packet includes an acknowledged transmission rate; and wherein the acknowledged transmission rate is one of the requested transmission rate the router inserted into the modified received network packet or a lesser requested transmission rate set by a subsequent router along the network path between the router and the second endpoint.

15. The router of claim 13, wherein execution of the instructions further causes the router to receive a third received network packet being transmitted across a network path from the first endpoint to the second endpoint, the third network packet sent in response to the second received network packet acknowledging receipt of the first network packet by the second endpoint, wherein the third received network packet reports the acknowledged transmission rate.

16. The router of claim 15, wherein execution of the instructions further causes the router to store the acknowledged transmission rate reported by the third received network packet.

17. The router of claim 13, wherein the requested rate is represented by more than four bits of the modified received network packet.

18. The router of claim 13, wherein execution of the instructions further causes the router to determine the requested rate based upon a number of flows going through the router along a portion of the network path and an amount of available bandwidth for the router along the portion of the network path.

19. A non-transitory machine-readable medium storing instructions that, when executed, cause a processing device to perform a method comprising:

transmitting, by a first endpoint, a received network packet across a network path from the first endpoint to a second endpoint, wherein the received network packet does not include an initial requested transmission rate when transmitted by the first endpoint, wherein a router within the network path determines that the received network packet does not include the initial requested transmission rate, wherein the router determines that a network packet prior to the received network packet and within a same flow as the received network packet includes an indication that indicates that the router within the network path is permitted to set the initial requested transmission rate, wherein the router modifies the received network packet to include the initial requested transmission rate in response to determining that the prior network packet includes the indication.

20. An endpoint computing device comprising:

a memory; and a processing device coupled to the memory, wherein the processing device executes instructions that cause the endpoint computing device to transmit a received network packet across a network path from the endpoint computing device to another endpoint, wherein the received network packet does not include an initial requested transmission rate when transmitted by the endpoint computing device, wherein a router within the network path determines that the received network packet does not include the initial requested transmission rate, wherein the router determines that a network packet prior to the received network packet and within a same flow as the received network packet includes an indication, wherein the indication indicates that the router within the network path is permitted to set the initial requested transmission rate, wherein the router modifies a received network packet to include the initial requested transmission rate in response to determining that the prior network packet includes the indication.

* * * * *